(12) United States Patent
McCarthy et al.

(10) Patent No.: US 9,194,533 B2
(45) Date of Patent: Nov. 24, 2015

(54) FIXTURE MOUNTING ASSEMBLY AND METHOD OF USING SAME

(71) Applicants: Peter McCarthy, Calgary (CA); Geoff Brennan, Calgary (CA)

(72) Inventors: Peter McCarthy, Calgary (CA); Geoff Brennan, Calgary (CA)

(73) Assignee: SMART Technologies ULC, Calgary (CA)

( * ) Notice: Subject to any disclaimer, the term of this patent is extended or adjusted under 35 U.S.C. 154(b) by 0 days.

(21) Appl. No.: 14/206,422

(22) Filed: Mar. 12, 2014

(65) Prior Publication Data

US 2014/0263890 A1    Sep. 18, 2014

Related U.S. Application Data

(60) Provisional application No. 61/801,862, filed on Mar. 15, 2013.

(51) Int. Cl.
| | |
|---|---|
| F16M 11/10 | (2006.01) |
| F16M 11/20 | (2006.01) |
| F16M 11/24 | (2006.01) |
| F16M 13/02 | (2006.01) |

(52) U.S. Cl.
CPC ........... *F16M 11/10* (2013.01); *F16M 11/2021* (2013.01); *F16M 11/24* (2013.01); *F16M 13/02* (2013.01); *Y10T 29/49826* (2015.01)

(58) Field of Classification Search
CPC ... F16M 13/022; F16M 13/02; F16M 11/046; F16M 11/10; F16M 11/06; F16M 11/24; F16M 11/2021; F16M 2200/028; A47B 47/02; Y10T 403/75; Y10T 29/49826; E06C 1/22; E06C 7/42; E06C 7/44; E06C 7/48

USPC ............... 248/205.1, 200.1, 235, 240, 240.2, 248/295.11, 297.31, 316.8, 479, 486, 475.1, 248/466, 472, 469; 182/172, 165, 204; 211/100
See application file for complete search history.

(56) References Cited

U.S. PATENT DOCUMENTS

| | | | | |
|---|---|---|---|---|
| 978,423 | A * | 12/1910 | Zizinia | 211/99 |
| 2,142,830 | A * | 1/1939 | Wendell | 211/100 |
| 3,211,295 | A * | 10/1965 | Weiss | 211/100 |
| 4,683,982 | A * | 8/1987 | Baker | 182/204 |
| 4,726,556 | A * | 2/1988 | Weir | 248/454 |
| 5,490,655 | A | 2/1996 | Bates | |
| 6,964,399 | B1 * | 11/2005 | O'Neill | 248/292.13 |
| 7,806,280 | B1 * | 10/2010 | Perkins et al. | 211/100 |
| 8,074,950 | B2 * | 12/2011 | Clary | 248/280.11 |
| 8,196,760 | B1 | 6/2012 | Gillespie | |
| 2002/0073632 | A1 | 6/2002 | Huffman | |
| 2008/0265121 | A1 | 10/2008 | Drew et al. | |
| 2010/0006719 | A1 | 1/2010 | Yen | |

(Continued)

FOREIGN PATENT DOCUMENTS

DE        202010000567 U      6/2010

OTHER PUBLICATIONS

Search report for United Kingdom Patent Application No. GB1404421.8 with a mailing date of Oct. 6, 2014.

*Primary Examiner* — Anita M King
(74) *Attorney, Agent, or Firm* — Katten Muchin Rosenman LLP

(57) ABSTRACT

A fixture mounting assembly comprises a track; and a fixture mount on the track and configured to engage a fixture, the track being pivotable between a generally upright orientation and a generally horizontal orientation where engagement of the fixture mount and fixture is facilitated.

20 Claims, 14 Drawing Sheets

(56) References Cited

U.S. PATENT DOCUMENTS

2010/0252695 A1 10/2010 Liu
2010/0327137 A1* 12/2010 Han et al. .................... 248/371
2012/0200834 A1 8/2012 Phillips
2012/0217690 A1 8/2012 Jenkins
2012/0293937 A1 11/2012 Myerchin

* cited by examiner

FIXTURE MOUNTING ASSEMBLY AND METHOD OF USING SAME

CROSS-REFERENCE TO RELATED APPLICATION

This application claims the benefit of U.S. Provisional Application No. 61/801,862 to McCarthy et al. filed on Mar. 15, 2013, entitled "Fixture Mounting Assembly", the entire content of which is incorporated herein by reference.

FIELD

The subject disclosure relates to a fixture mounting assembly and a method of using the same.

BACKGROUND

Fixture mounting assemblies are well known and are used to mount fixtures such as display devices of various sizes on walls or other supporting structures within homes, office buildings, public venues etc. In use, the fixture mounting assemblies are typically installed on supporting structures at their desired positions and then once installed, fixtures are connected to the fixture mounting assemblies. When the fixtures are of a small format, connecting the fixtures to the installed fixture mounting assemblies can be readily performed. However, when the fixtures are of a large format, connecting the fixtures to the installed fixture mounting assemblies can be difficult and time consuming.

U.S. Pat. No. 8,196,760 to Gillespie discloses an adjustable mounting system for mounting a display on a fixture. First and second supports each include a bracket portion and a lateral arm portion. The bracket portion of the first support is operatively connectable to the fixture at a first location and the bracket portion of the second support is operatively connectable to the fixture at a second location. A cross support includes a first lateral adjustment arm, a second lateral adjustment arm, and an adapter arm. The first lateral adjustment arm is adjustably connected to the first lateral arm and the second lateral adjustment arm is adjustably connected to the second lateral arm. A display adapter is adjustably connected to the adapter arm and the display adapter includes an adapter support arm and an adapter bracket configured for operative connection to a display.

U.S. Pat. No. 5,490,655 to Bates discloses a mount that secures a projector or monitor to a ceiling or wall. The mount uses struts that form channels which support the projector/monitor and provide alternate channels for video and AC cabling to reduce interference. The mount includes a hook connector such that the projector or monitor can easily be detached from the ceiling or wall for installation and repair. A winch may be used to lower and raise the projector/monitor. Seismic cables may be added for extra support in case of earthquake.

Although fixture mounting assemblies are known, improvements are desired. It is therefore an object to provide a novel fixture mounting assembly and method of using the same.

SUMMARY

Accordingly, in one aspect there is provided a fixture mounting assembly comprising a track; and a fixture mount on the track and configured to engage a fixture, said track being pivotable between a generally upright orientation and a generally horizontal orientation where engagement of said fixture mount and fixture is facilitated.

In one embodiment, the track comprises at least one rail. The fixture mount may be moveable along the rail. The track may further comprise at least one retainer configured to retain the track in the upright orientation. In one form, the retainer is configured to act between the track and an upright support surface. The retainer may comprise a component carried by each rail and a component mounted on the support surface with the components being engageable to retain the track in the upright condition and disengageable to permit pivoting of the track to the generally horizontal orientation.

In one embodiment, the track further comprises a base mount pivotally coupled to each rail adjacent a bottom end thereof. The base mount may be configured for connection to at least one of the upright surface and a floor surface. The height of the base mount may be adjustable. The height of the base mount may be generally equal to the depth of the packaging of the fixture.

In one embodiment, the fixture mount comprises a locking mechanism to fix the position of the fixture mount on the rail. The fixture mount may be pivotally mounted on the track.

According to another aspect there is provided a fixture installation method comprising connecting a fixture to a fixture mount on a track while the track is in a horizontal orientation; and pivoting the track and connected fixture to a generally upright orientation.

BRIEF DESCRIPTION OF THE DRAWINGS

Embodiments will now be described more fully with reference to the accompanying drawings in which.

DETAILED DESCRIPTION OF THE EMBODIMENTS

Figure 1:
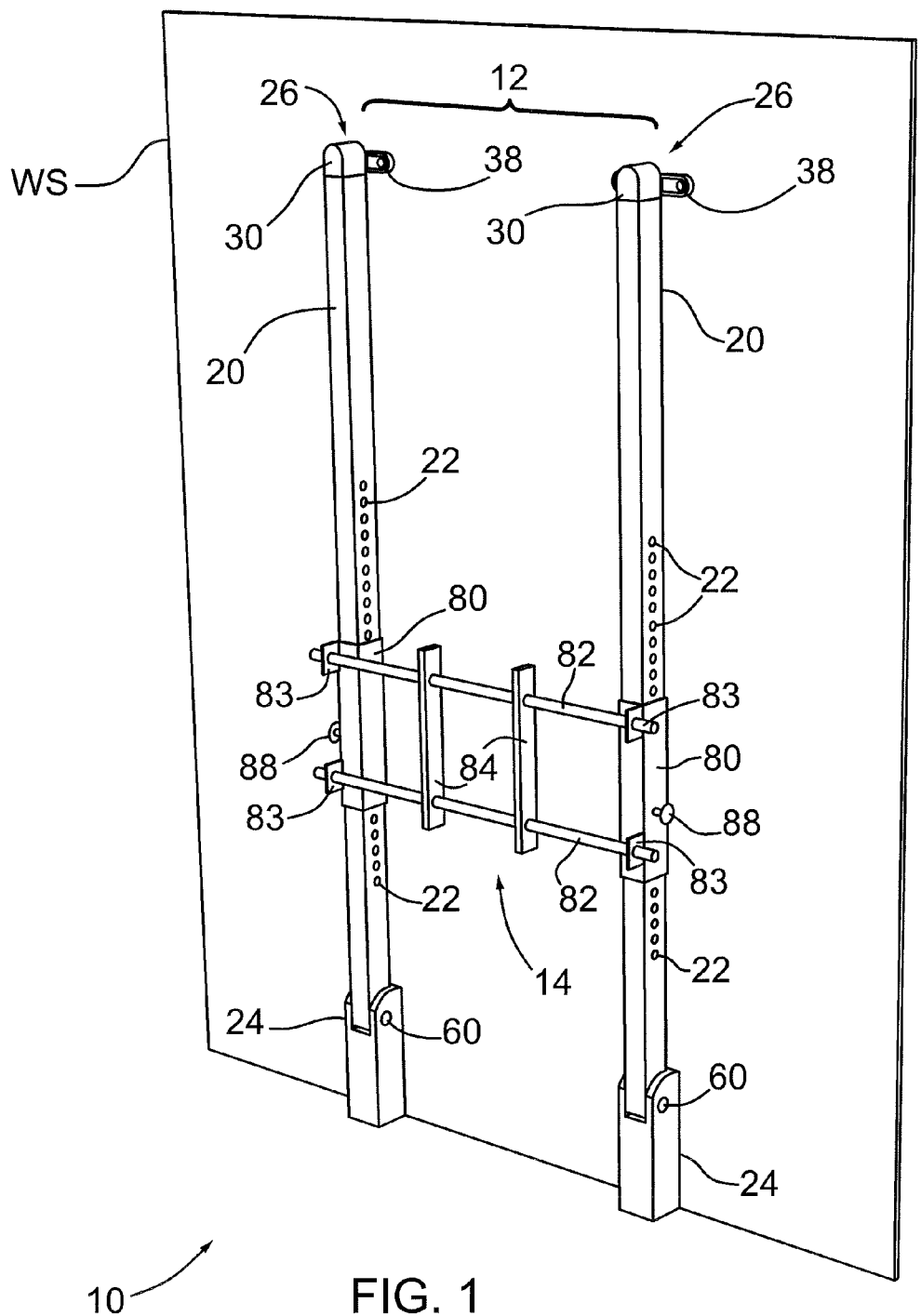
FIG. 1 is a perspective view of a fixture mounting assembly in an upright orientation and mounted to a wall surface.

Turning now to FIG. 1, a fixture mounting assembly to support a fixture in the form of a display unit or panel, such as for example a liquid crystal display (LCD) panel, a plasma display panel or other display device, in an elevated position and in a generally upright orientation, is shown and is generally identified by reference numeral 10. As can be seen, in this embodiment, the fixture mounting assembly 10 abuts against an upright surface such as a wall surface WS or the like. The fixture mounting assembly 10 comprises a track 12 and a fixture mount 14 moveable along the track 12 that is configured to connect to the display panel to be supported. The fixture mounting assembly 10 facilitates connection of the fixture mount 14 to the display panel and the subsequent positioning of the display panel at its desired elevation and orientation as will be described.

In this embodiment, the track 12 comprises a pair of laterally spaced, upright, tubular lever rails 20. A series of vertically spaced holes 22 is provided in each of the rails 20. The bottom end of each rail 20 is received by a respective base mount 24 and the top end of each rail 20 is provided with a retainer 26. Each retainer 26 is configured to engage the wall surface WS to retain the rail 20 in its upright orientation against the wall surface WS.

Figure 2A:
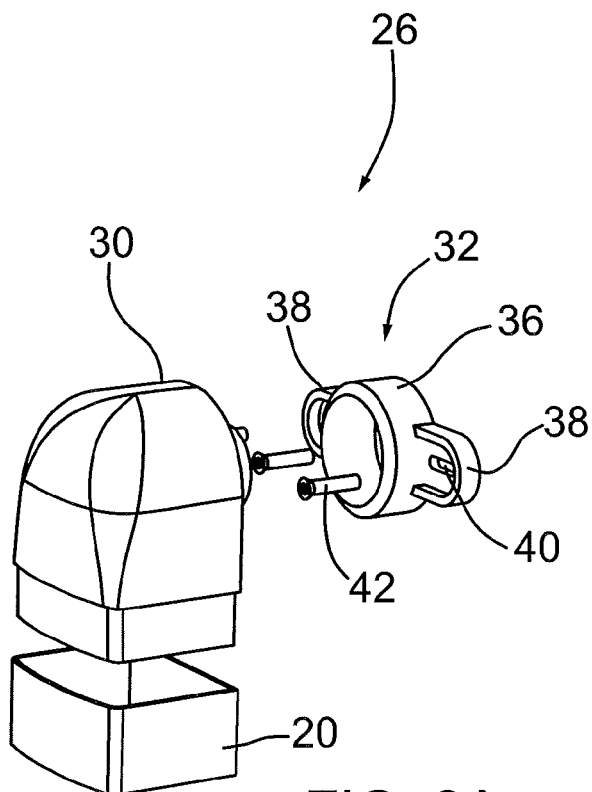
FIG. 2A is an exploded perspective view of a retainer forming part of the fixture mounting assembly of FIG. 1.
Figure 2B:
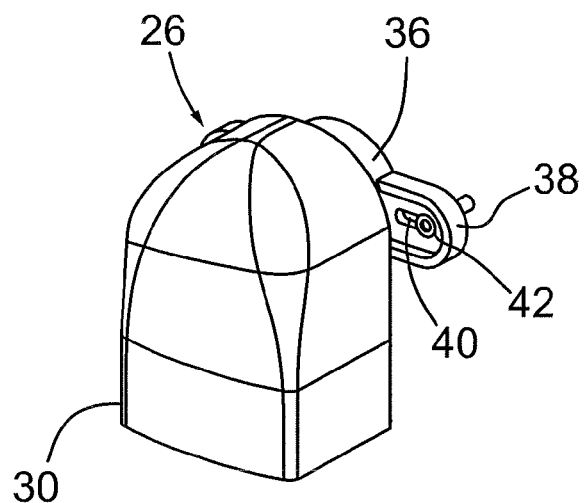
FIG. 2B is a perspective view of the retainer of FIG. 2A.

One of the retainers 26 is shown in FIGS. 2A and 2B. As can be seen, the retainer 26 comprises a top cap 30 that is press-fitted into the open top end of the rail 20 and a mount clip 32 that is secured to the wall surface WS. The top cap 30 and mount clip 32 have mating surface configurations that releasably engage when pushed together. The mount clip 32 comprises a generally cylindrical body 36 having diametric wings 38 thereon that extend outwardly from the body 36. Each wing 38 has an elongate aperture 40 provided therein. Fasteners 42 in the form of screws pass through the apertures 40 and threadably engage the wall surface WS thereby to affix the mount clip 32 to the wall surface.

Figure 3A:
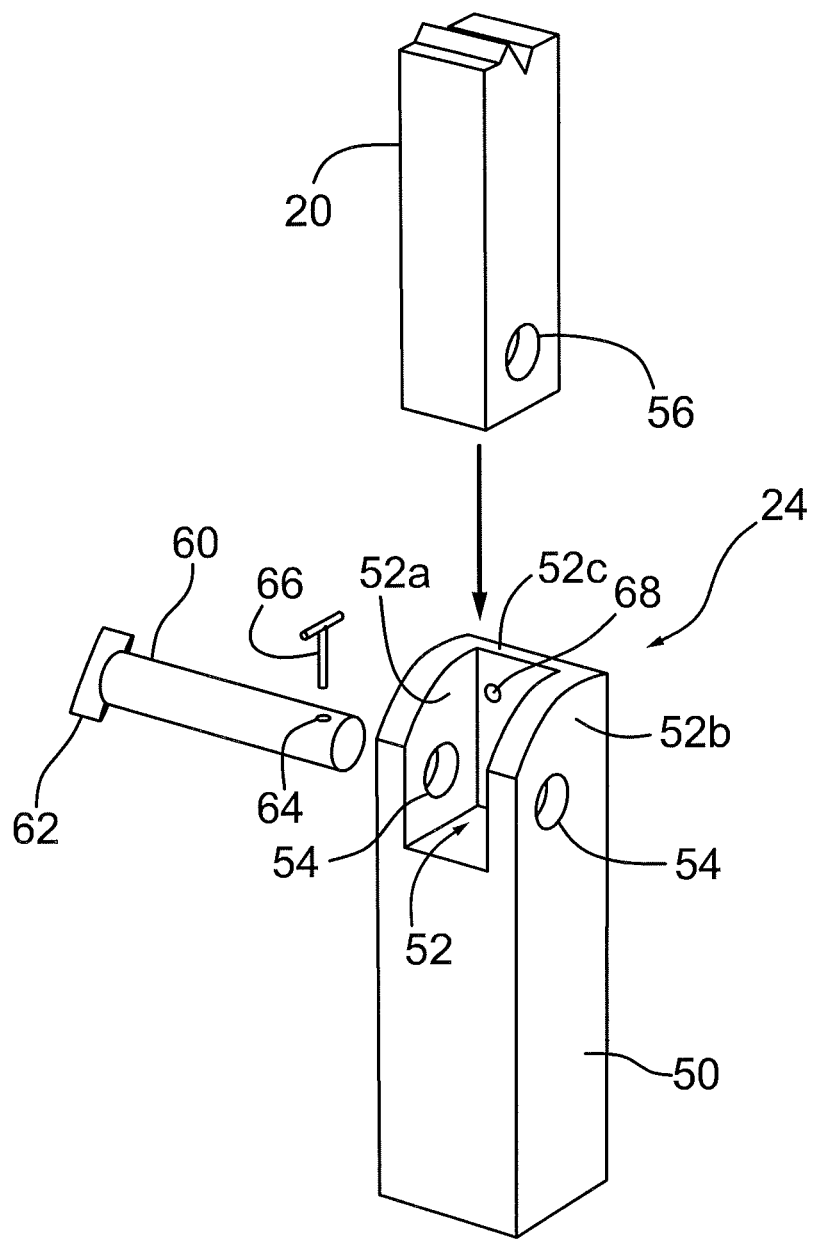
FIG. 3A is an exploded perspective view of a base mount forming part of the fixture mounting assembly of FIG. 1.
Figure 3C:
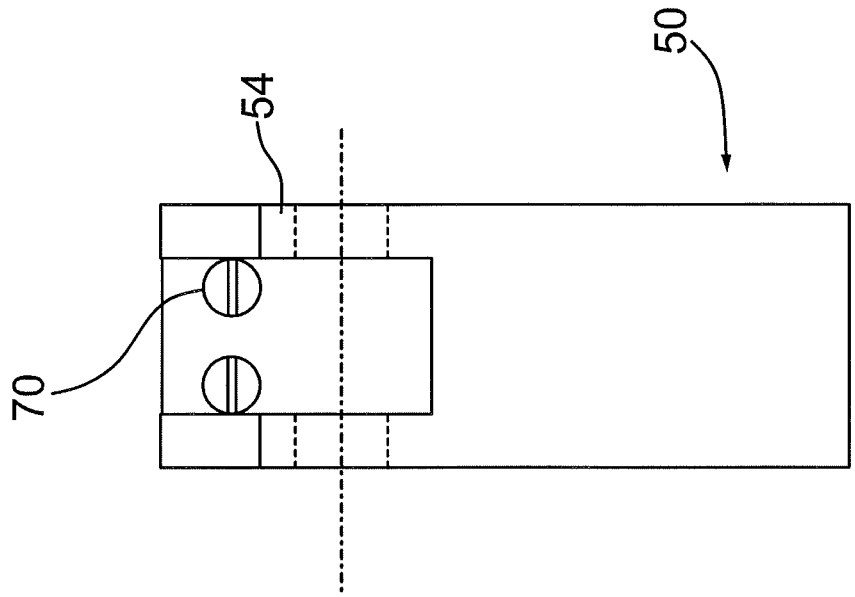
FIGS. 3B and 3C are perspective and front elevational views, respectively, of the base mount of FIG. 3A.
Figure 3B:
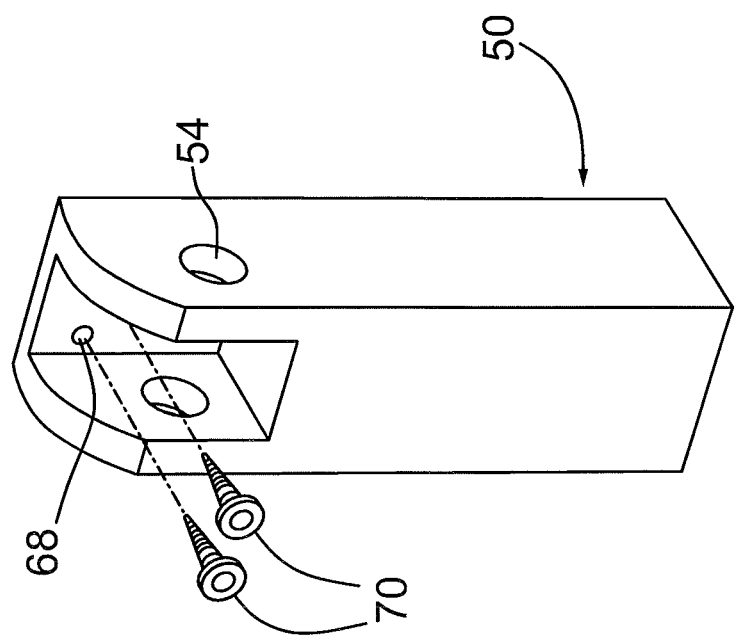

Turning now to FIGS. 3A to 3C, one of the base mounts 24 is shown. As can be seen, the base mount 24 comprises a generally rectangular body 50 having a bottom that rests on a floor surface, a back wall that abuts against the wall surface WS and a curved upper end. A recess 52 is formed in the upper end of the body 50 and is sized to accommodate the bottom end of the rail 20. The recess 52 is bordered by three walls 52a to 52c of the body 50. Aligned apertures 54 are provided in opposite walls 52a and 52b of the body. The apertures 54 align with an aperture 56 provided in the rail 20 adjacent its bottom end. A pivot pin 60 having a handle 62 at one end extends through the aligned apertures 54 and 56. A hole 64 is provided adjacent the opposite end of the pivot pin 60 and receives a retaining pin 66 to inhibit the pivot pin 60 from being removed. A pair of spaced holes 68 is provided in the body wall 52c. Fasteners 70 pass through the holes 68 and engage the wall surface WS thereby to secure the base mount 24 to the wall surface. During installation, each rail, base mount and retainer arrangement is typically positioned in alignment with a stud of the wall surface WS to ensure that the base mounts 24 and mount clips 32 are securely fastened to the wall surface WS.

The base mounts 24 are also designed such that their weights provide significant inertia against undesired movement of the fixture mounting assembly 10. Also, the height of the base mounts 24 is chosen to be approximately equal to the depth of a packaging box for the display panel to be supported, the reason for which will be explained.

The fixture mount 14 comprises a pair of sleeves 80, each sleeve 80 of which surrounds a respective one of the rails 20. Generally horizontal, vertically spaced slider rails 82 span the sleeves 80 and pass through flanges 83 extending from the sleeves 80. The slider rails 82 also pass through generally vertical mount rails 84. The mount rails 84 are slideable along the slider rails 82 allowing the lateral spacing of the mount rails 84 to be adjusted. In this embodiment, the mount rails 84 conform to the Flat Fixture Mounting Interface (FDMI™) standard specified by Video Electronics Standards Association (VESA). Those of skill in the art will however appreciate that the format of the mount rails 84 may be adjusted to suit the type of display panel to be supported. A releasable locking pin 88 is associated with each sleeve 80 and passes through a hole in the sleeve that is in alignment with one of the holes 22 in the rail 20 that is surrounded by the sleeve 80. In this manner, the position of the fixture mount 14 relative to the rails 20 can be fixed. When the locking pins 88 are released and removed from the aligned holes, the fixture mount 14 can be slid vertically along the rails 20 to its desired vertical position. Once at its desired position, the locking pins 88 can again be inserted into the aligned holes in the sleeves 80 and rails 20 to fix the fixture mount 14 in position.

In this embodiment, all of the components of the fixture mounting assembly 10 are formed of metal, such as steel, ensuring that the fixture mounting assembly 10 is suitably rigid and structurally able to support the display panel. Of course, other suitable structural materials may be employed.

As mentioned previously, the design of the fixture mounting assembly 10 facilitates both connection of a display panel thereto as well as positioning of the display panel to its desired location. The manner by which a display panel is connected to the fixture mounting apparatus 10 and then subsequently positioned at its desired location relative to the wall surface WS will now be described with particular reference to FIGS. 4 to 6.

Figure 4:
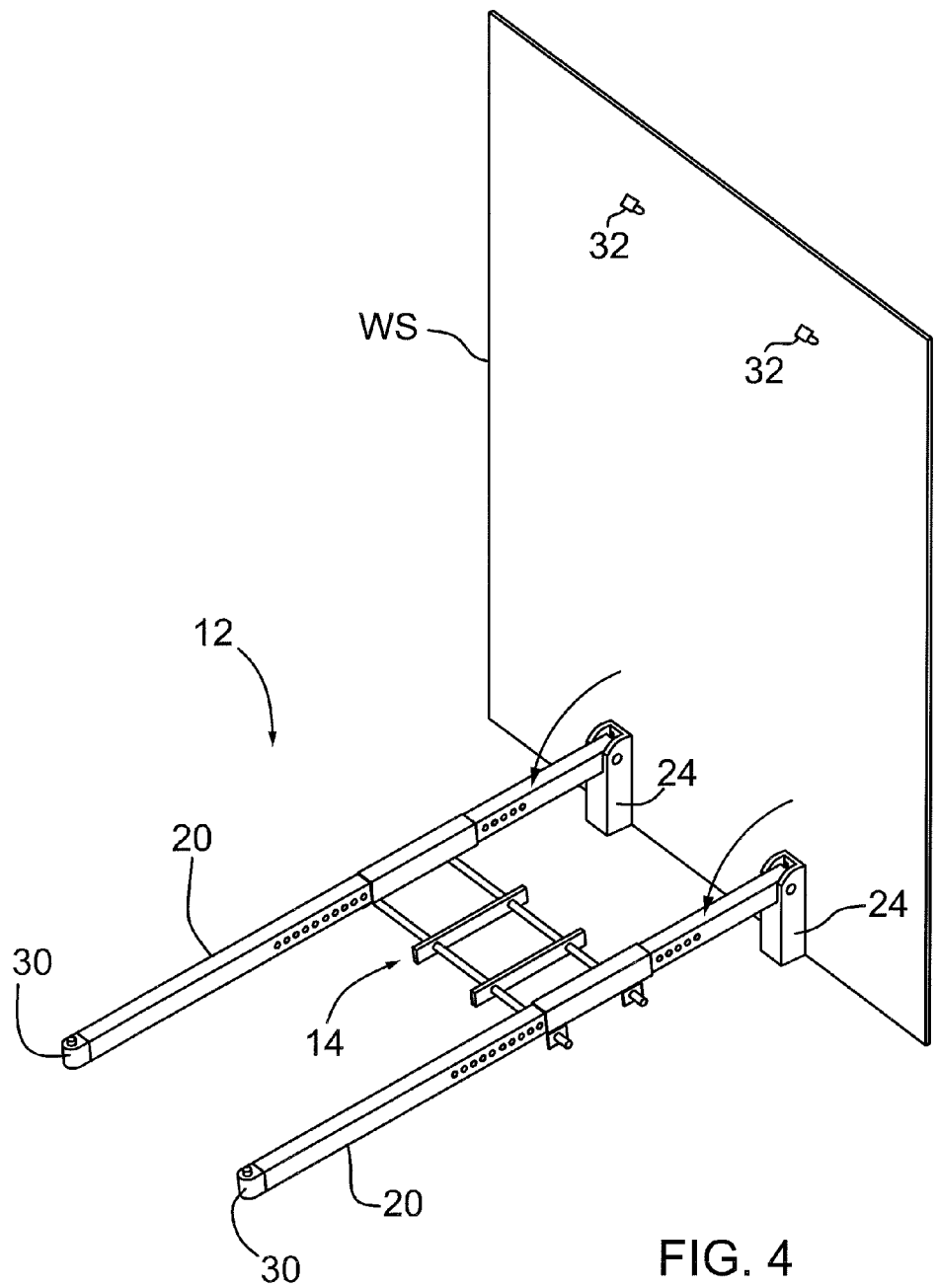
FIGS. 4 to 6 are perspective views of the fixture mounting assembly of FIG. 1 in different orientations during connection of a display panel thereto and subsequent positioning of the display panel.
Figure 5:
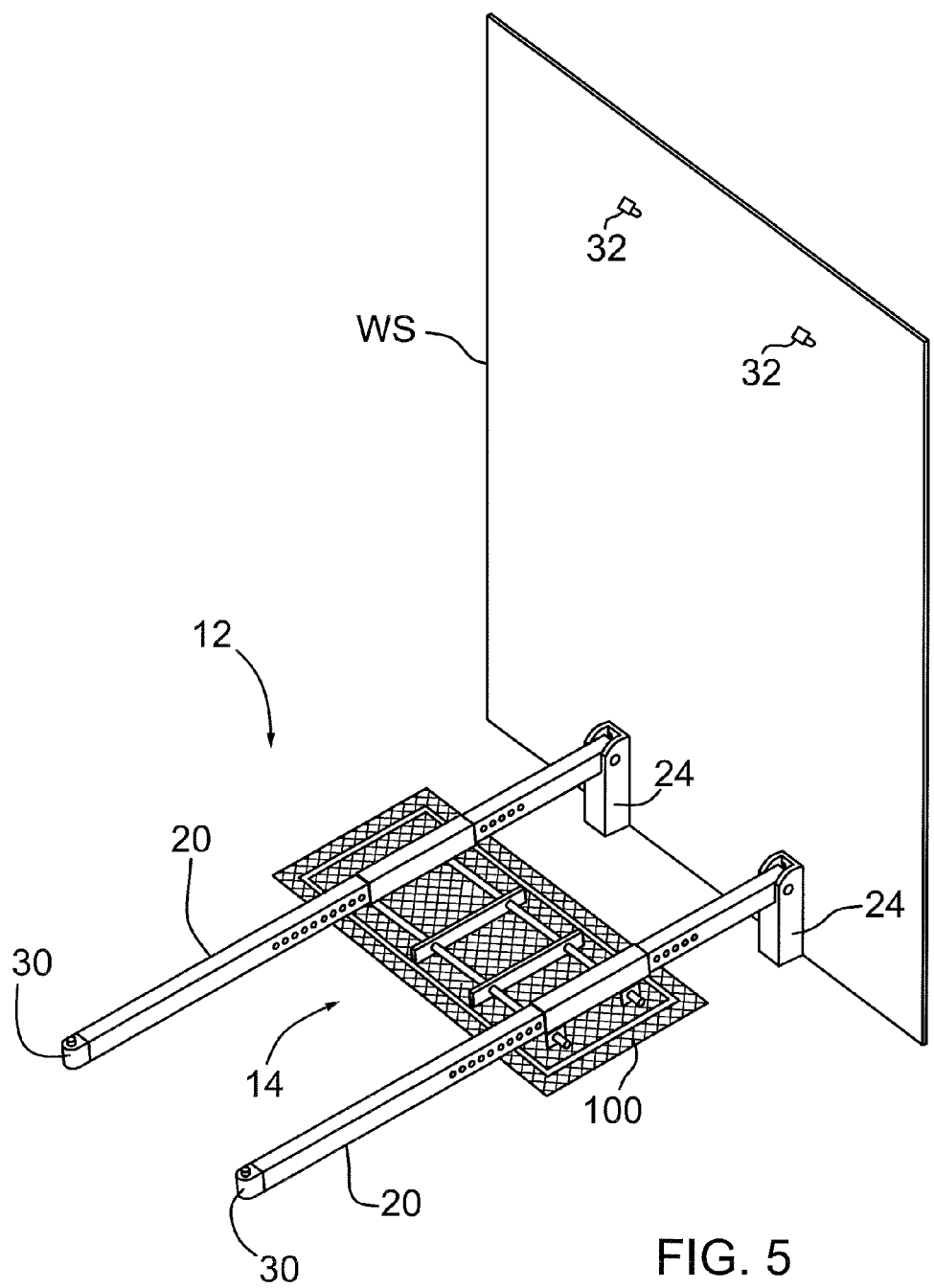

When it is desired to connect a display panel to the fixture mounting assembly 10, the rails 20 are pulled outwardly away from the wall surface WS causing the mating surface configurations of the top caps 30 and mount clips 32 to disengage. Once the top caps 30 are released from the mount clips 32, the rails 20 are pivoted downwardly about the pivot pins 60 of the base mounts 24 so that the rails 20 assume a generally horizontal orientation as shown in FIG. 4. The display panel 100 to be connected to the fixture mounting assembly 10, face down and still in its packaging, is then positioned beneath the rails 20 as shown in FIG. 5. Of course, those of skill in the art will appreciate that the display panel 100 in its packaging can be positioned adjacent the fixture mounting assembly 10 before the rails 20 are moved to the generally horizontal orientation. Because the height of the base mounts 24 is chosen to be approximately equal to the depth of the display panel packaging, when the rails 20 are in the generally horizontal orientation, the fixture mount 14 is positioned in a plane that is substantially coincident with the back of the display panel 100. As a result, the display panel 100 can be attached to the fixture mount 14 easily and without requiring significant manipulation of the display panel 100.

With the display panel 100 face down in its packaging positioned beneath the rails 20, the display panel 100 and fixture mount 14 are brought into alignment either by sliding the display panel 100 and packaging along the floor surface, adjusting the position of the fixture mount 14 along the rails 20 by releasing the locking pins 88 as described above or by performing a combination of these actions. With the fixture mount 14 in alignment with the back of the display panel 100, the mount rails 84 are slidably adjusted along the slider rails 82 to bring them into the proper locations for engagement with the back of the display panel 100 and the mount rails 84 are engaged with the back of the display panel in the known manner.

Figure 6:
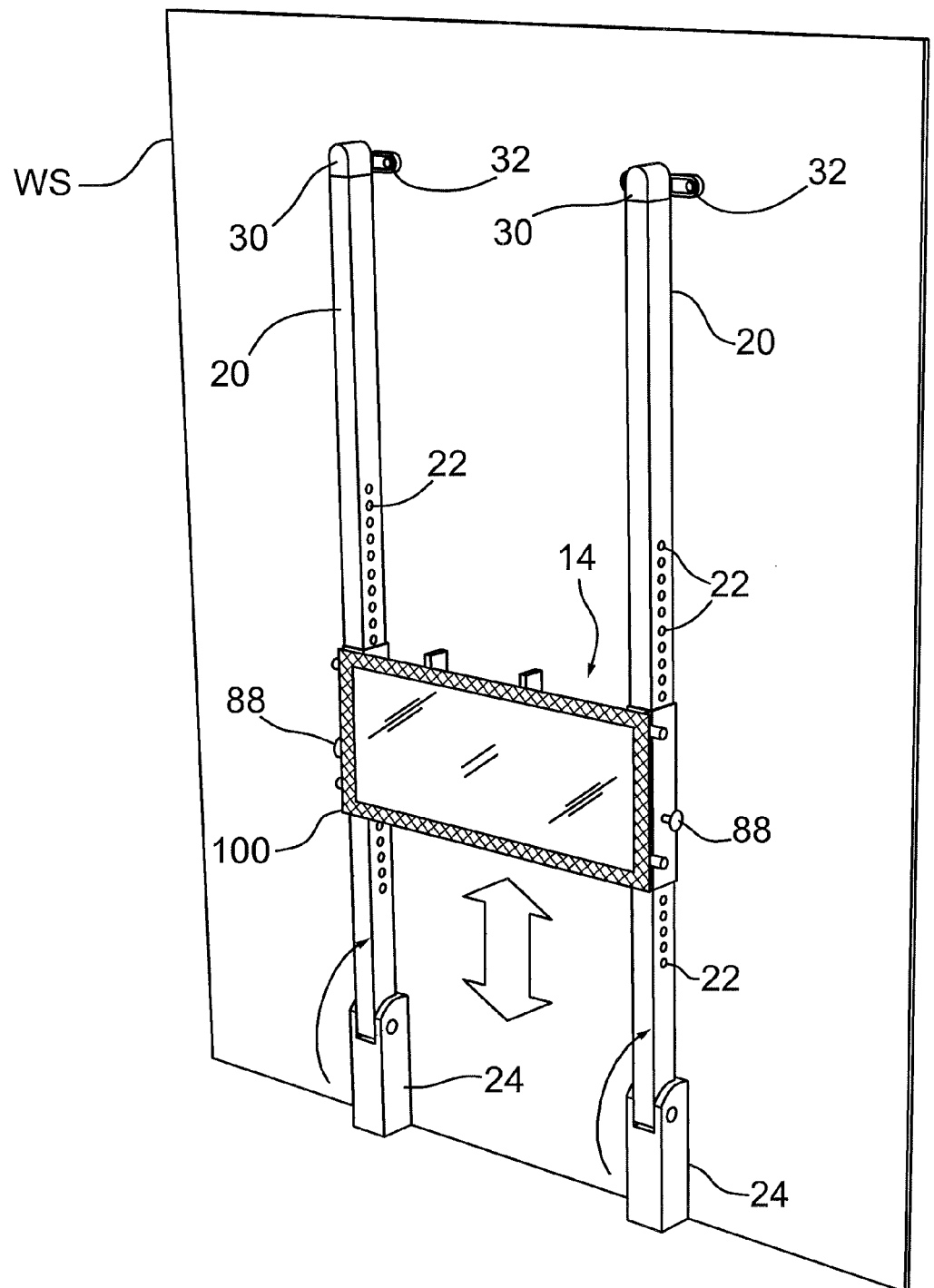

With the back of the display panel 100 engaged with the mount rails 84, the rails 20 are pivoted upwardly back to their generally upright orientation thereby to bring the rails 20 into abutment against the wall surface WS and so that the top caps 30 are pressed into the mount clips 32 to bring their mating surface configurations into engagement thereby to retain the rails 20 in the upright orientation as shown in FIG. 6. At this stage, if the display panel 100 is not at its desired position, the locking pins 88 are removed from aligned holes in the sleeves 80 and rails 20 allowing the fixture mount 14 and connected display panel 100 to be slid vertically along the rails 20 to the desired elevation. Once the fixture mount 14 and display panel 100 are at the desired position, the locking pins 88 are inserted into the aligned holes in the sleeves 80 and rails 20 thereby to fix the fixture mount 14 and display panel 100 in position.

Although the retainers 26 are described as comprising top caps 30 that are press-fit into the open top ends of the rails 20, those of skill in the art will appreciate that other configurations are possible. For example, the retainers 26 may be attached to the rails 20 in other suitable fashions or may be integrally formed with the rails 20.

Figure 7:
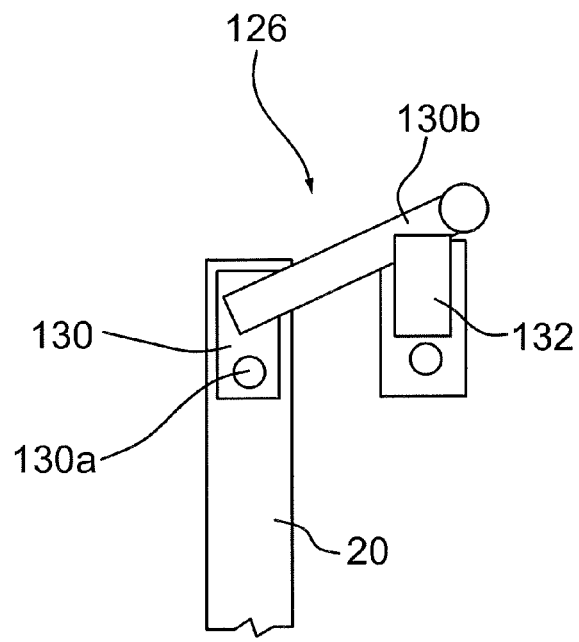
FIG. 7 is a front elevational view of an alternative retainer.

Of course still other retainer configurations are possible. Turning now to FIG. 7, an alternative retainer is shown and is generally identified by reference numeral 126. In this embodiment, the retainer 126 comprises a plate 130 that is affixed to the front surface of its respective rail 20 by a suitable fastener 130a. A latch 130b is rotatably affixed to the plate 130. A catch 132 is affixed to the wall surface WS to one side of the rail 20 and is configured to retain the latch 130b thereby to retain the rail 20 in the upright orientation. To release the rail 20, the latch 130b simply needs to be rotated upwardly out of the catch 132.

In another embodiment, the rails 20 are retained against the wall surface WS via a safety spring or safety device such as that described in U.S. Patent Application Publication No. 2009/01738671 to Auger et al., the relevant portions of the disclosure of which are incorporated herein by reference.

Although a particular base mount configuration has been described above, alternative base mount configurations are possible. For example, turning now to FIG. 8 an alternative base mount 124 is shown. In this embodiment, the recess 152 formed in the body 150 is deeper than in the previous embodiment. Two vertically spaced holes 154 are provided in each of the body walls 152a and 152b bordering the recess 152. Spaced holes 156 are also provided adjacent the bottom end of the rail 20 that is received by the recess 152. The holes 156 are alignable with the holes 154 in the body walls 152a and 152b. Each pair of aligned holes 154 is able to accommodate the pivot pin 60. When the pivot pin 60 passes through the upper holes 154 in the body walls 152a and 152b and the upper hole 156 in the rail 20, the rail 20 is inhibited from pivoting. Moving the pivot pin 60 such that it passes through the lower holes 154 in the body walls 152a and 152b and the lower hole 156 in the rail 20, allows the rail 20 to pivot. As will be appreciated, if each set of aligned holes 154 and 156 accommodates a pivot pin 60, the pivot pin 60 passing through the upper holes 154 in the body walls 152a and 152b and through the upper hole 156 in the rail 20 needs to be removed in order to pivot the rail.

Figure 8:
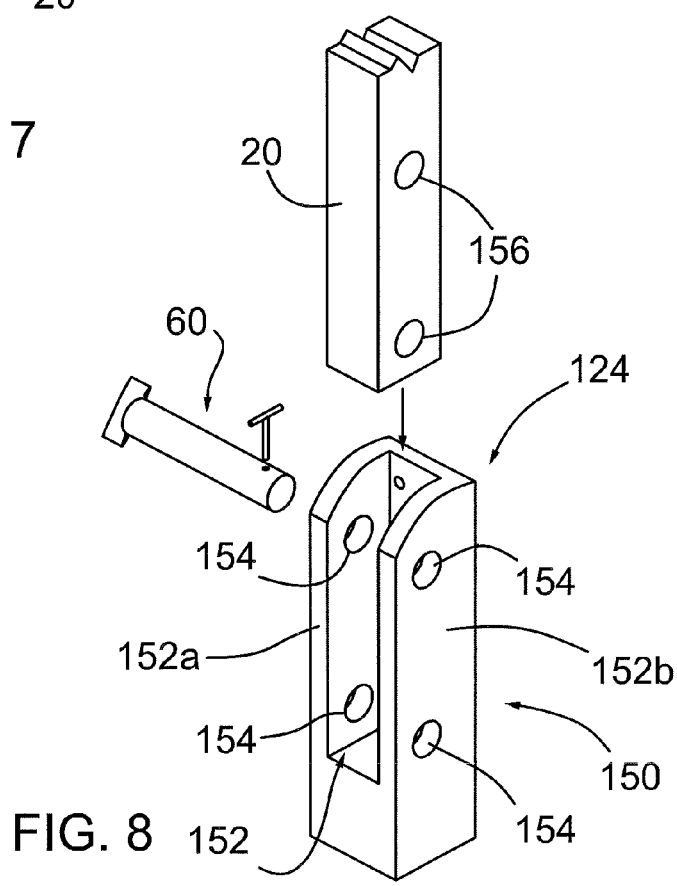
FIG. 8 is an exploded perspective view of an alternative base mount.
Figure 9:
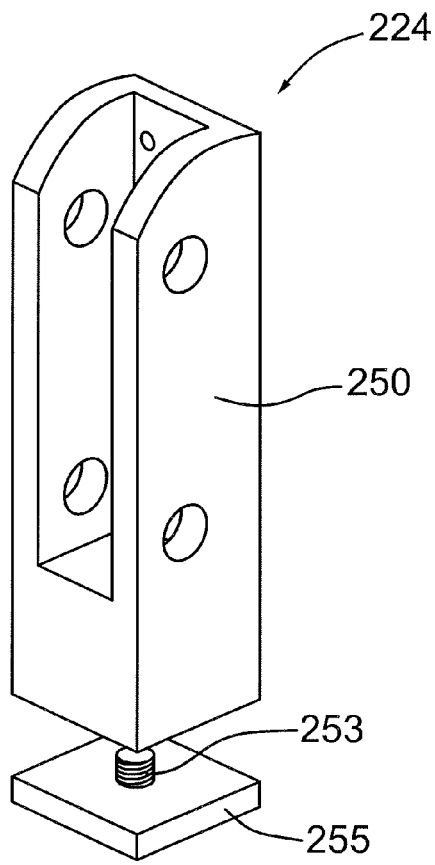
FIG. 9 is a perspective view of yet another embodiment of a base mount.

FIG. 9 shows another embodiment of a base mount 224 similar to that shown in FIG. 8. In this embodiment, the body 250 of the base mount 224 is mounted on a threaded post 253 extending upwardly from a plate 255 that is secured to the floor surface. Rotating the base mount 224 advances the body 250 along the threaded post 253. Depending on the direction of rotation, the body 250 either advances towards or away from the floor surface allowing the height of the base mount 224 to be adjusted.

Figure 10:
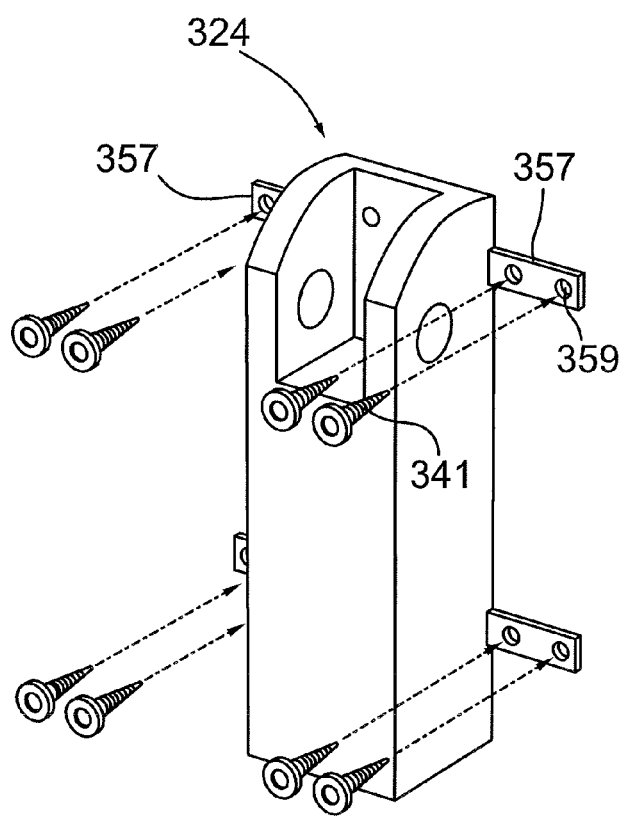
FIG. 10 is a perspective view of yet another embodiment of a base mount.

In some embodiments described above, each base mount is secured to the wall surface WS by fasteners that pass through holes in a wall of the body that borders the recess. Other fastening configurations are however, possible. For example, turning to FIG. 10 yet another embodiment of a base mount 324 is shown. As can be seen, base mount 324 is similar to that shown in FIGS. 3A to 3C. Rather than including holes in the body wall through which fasteners pass to secure the base mount to the wall surface WS, in this embodiment flanges 357 extend outwardly from the sides of the body 350 at vertically spaced locations. Each flange 357 has a pair of laterally spaced holes 359 therein through which fasteners 341 pass to secure the base mount 324 to the wall surface WS. Although the base mount is shown as comprising four flanges 357, those of skill in the art will appreciate that fewer or more flanges may be used. Also, each flange need not include two holes. A single hole or more than two holes configured to receive fasteners may be provided in the flanges 357.

Figure 11:
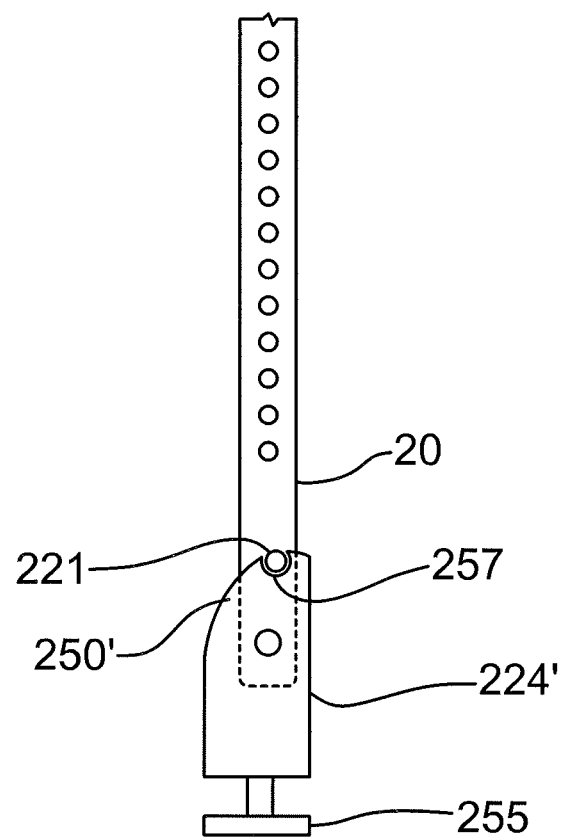
FIG. 11 is a side elevational view of yet another embodiment of a base mount.

FIG. 11 shows yet another embodiment of a base mount 224' that is similar to the base mount shown in FIG. 9. In this embodiment, the curved top end of the body 250' has a shallow notch 257 formed therein that is sized to receive a small post 221 extending outwardly from the side of the rail 20 thereby to assist in retaining the rail 20 in an upright orientation. When it is desired to move the rail 20 to the horizontal orientation, the configurations of the post 221 and notch 257 require that a significant outward force be applied to the rail 20 in order to dislodge the post 221 from the notch 257.

Figure 12:
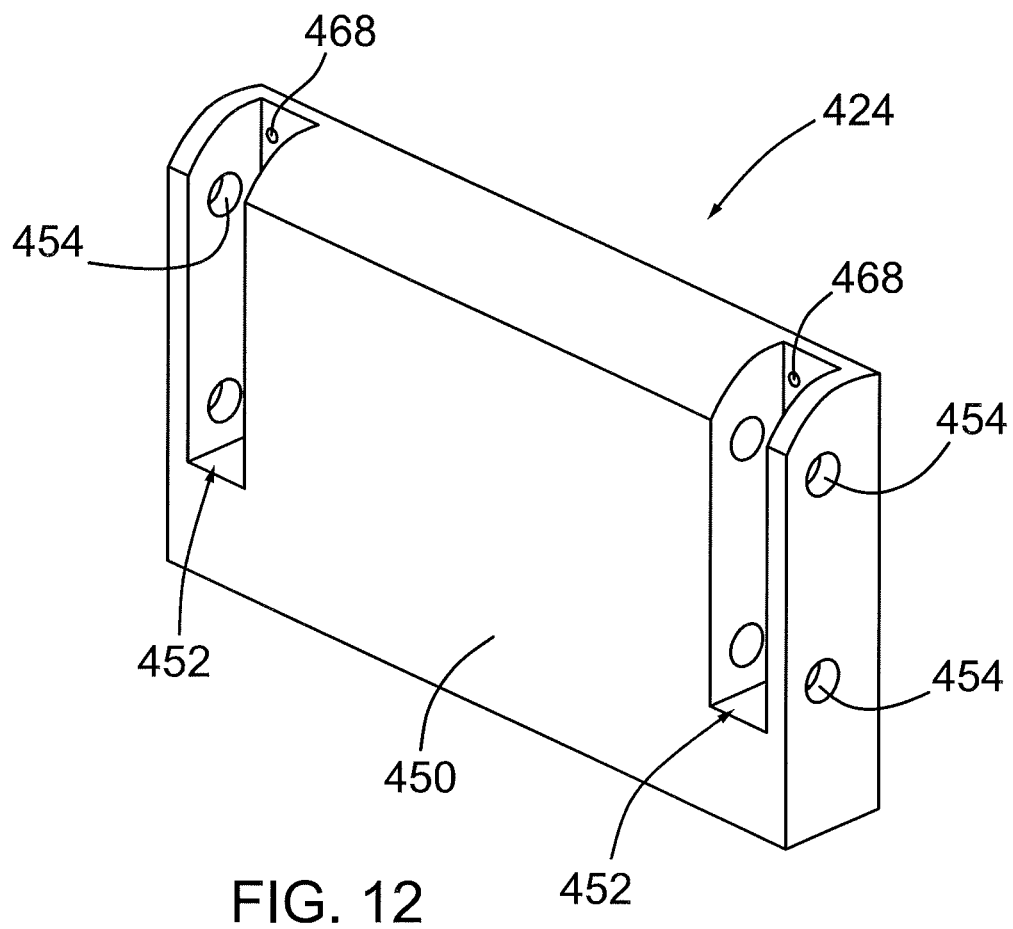
FIG. 12 is a perspective view of yet another embodiment of a base mount.

Rather than employing separate base mounts, each associated with a respective rail, a single base mount 424 can be employed as shown in FIG. 12. In this embodiment, the body 450 of the base mount 424 has two laterally spaced recesses 452 formed therein, each sized to accommodate a respective rail 20. The recesses 452 as shown have a configuration similar to that shown in FIG. 8 and are bordered by body walls, each having a pair of vertically spaced holes 454 therein. Those of skill in the art will however appreciate that the recesses 452 may have a configuration similar to that shown in FIGS. 3A to 3C and be bordered by body walls, each having a single hole therein. In this embodiment, the base mount 424 may be fastened to the wall surface WS by fasteners passing through holes 468 provided in the body walls or flanges may extend from the body 450 and accommodate fasteners.

Although a particular fixture mount configuration is described above, those of skill in the art will appreciate that various configurations are possible. For example, if desired the fixture mount may be of a unitary fixed construction. Although such a construction may limit the type of display panel to which the fixture mount can be connected, such a construction does provide increased rigidity.

Figure 13:
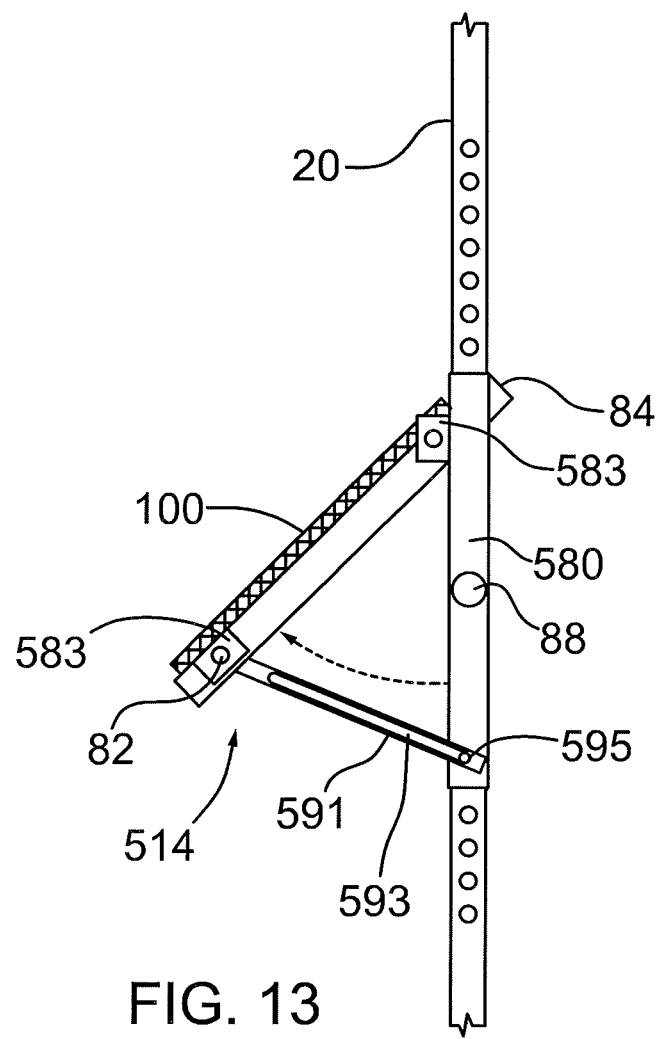
FIG. 13 is a side elevational view of an alternative fixture mount.

Turning now to FIG. 13, another fixture mount to which display panel 100 is attached, is shown and is generally identified by reference numeral 514. In this embodiment, each lower flange 583 is connected to its respective sleeve 580 via an elongate arm 591. Each elongate arm 591 has an elongate slot therein 593 that receives a pin 595 extending from the side of its respective rail 20. The slots 593 allow the arms 591 to slide relative to the sleeves 580 thereby to allow the fixture mount 14 to pivot relative to the rails 20 as shown.

Figure 14:
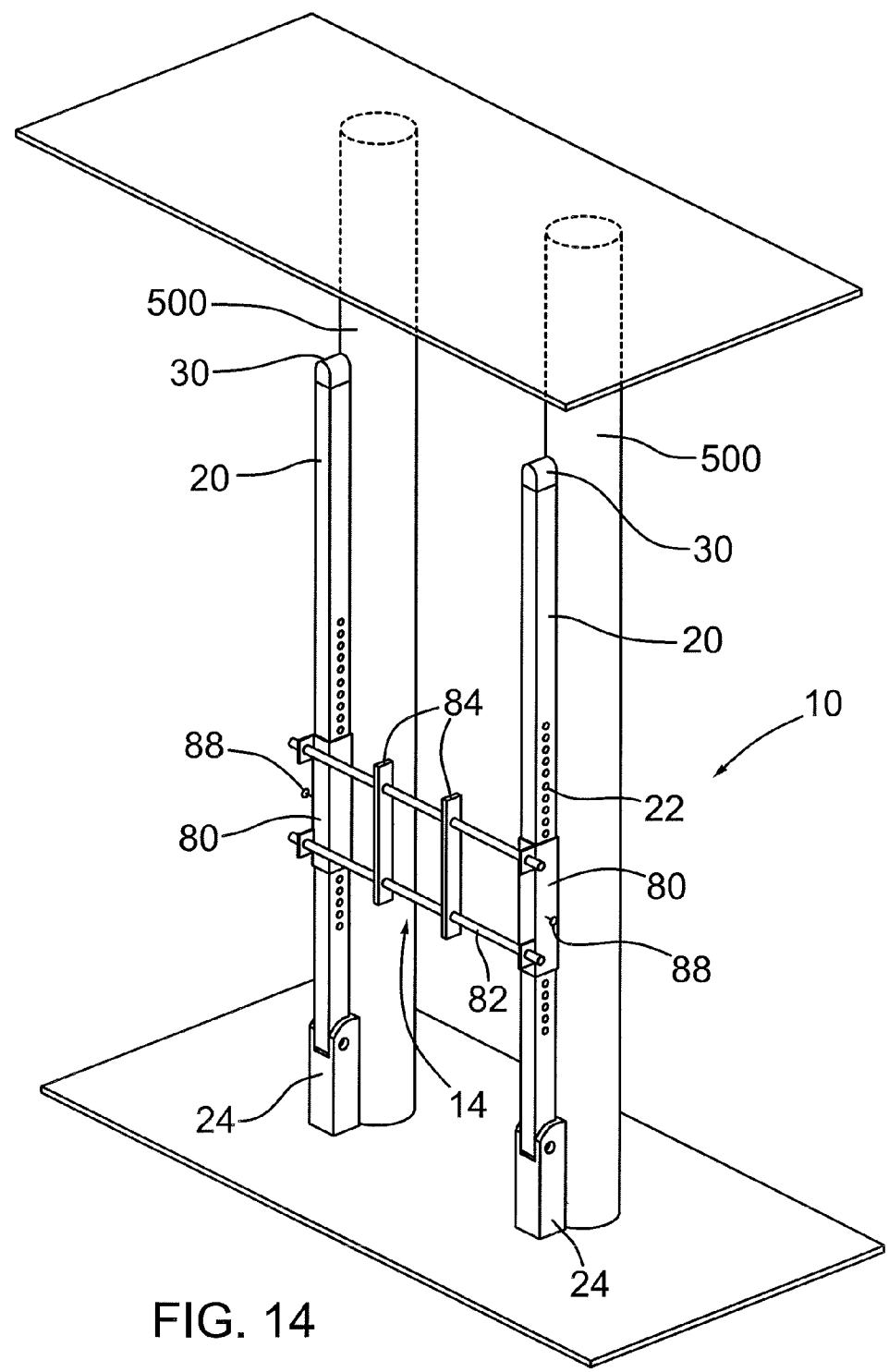
FIG. 14 is a perspective view of the fixture mounting assembly of FIG. 1 mounted to laterally spaced uprights.

In the embodiments described above, the fixture mounting assembly 10 is described as abutting against a wall surface WS. Those of skill in the art will appreciate that the fixture mounting assembly 10 may be connected to other structures. For example, as shown in FIG. 14, the fixture mounting assembly 10 is connected to a pair of laterally spaced uprights 500 such as for example, columns, posts, wall studs etc. rather than to the wall surface. In this case, each rail, base mount and retainer arrangement is aligned with a respective upright 500.

Figure 15:
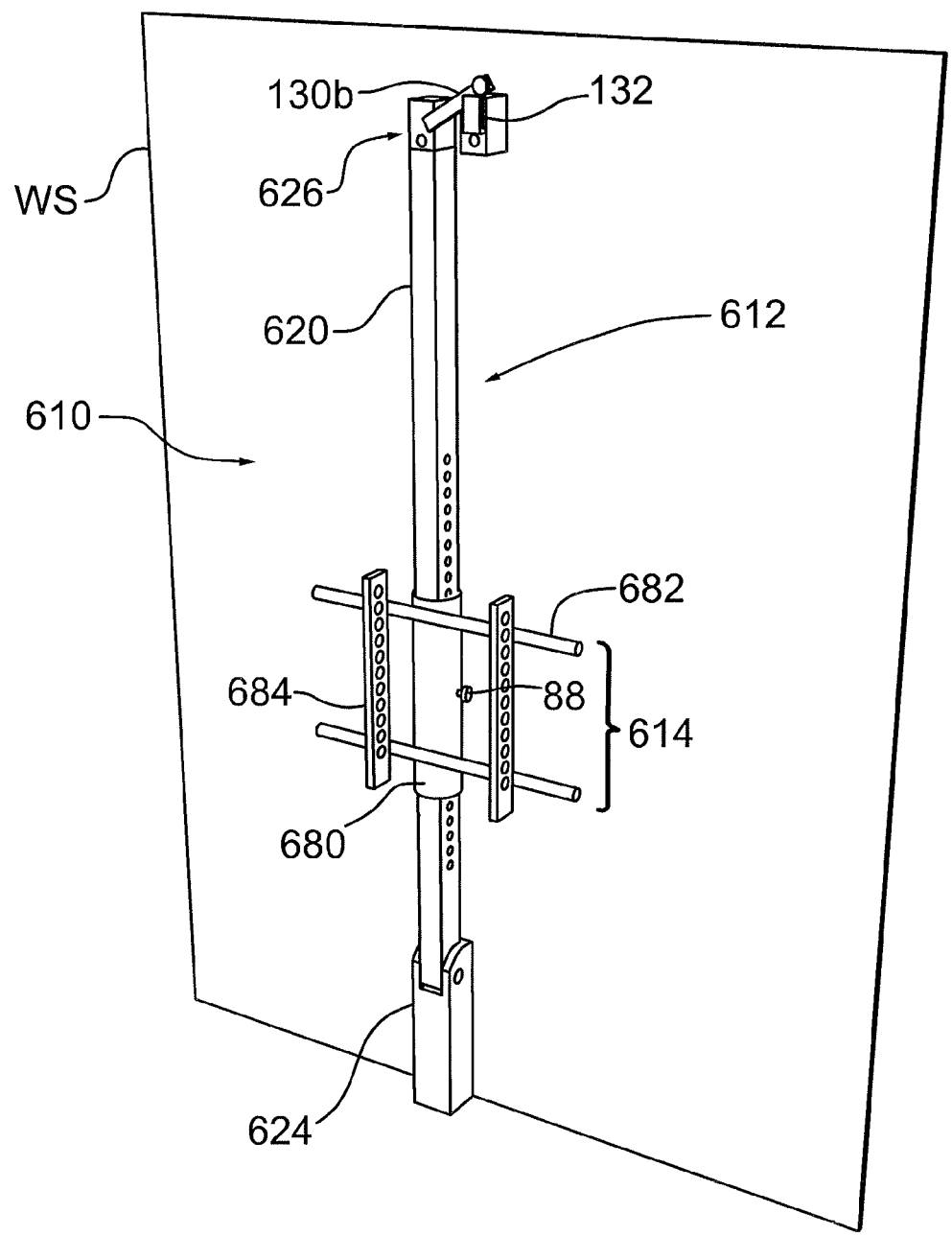
FIG. 15 is a perspective view of another embodiment of a fixture mounting assembly.

FIG. 15 shows yet another embodiment of a fixture mounting assembly 610. In this embodiment, the track 612 of the fixture mounting assembly 610 comprises a single rail 620, base mount 624 and retainer 626. The rail 620 and base mount 624 have a configuration similar to those shown in the embodiment of FIG. 1. The retainer 626 is of the type shown in FIG. 7.

The fixture mount 614 comprises a sleeve 680 that surrounds the rail 620. A pair of vertically spaced, generally horizontal arms 682 extends outwardly from opposite sides of the sleeve 680. A generally vertical fixture mount 684 spans each pair of arms 682. The fixture mounts 684 are configured to engage the back of a display panel 100.

If desired, the fixture mounting assembly can be installed substantially at the same time as the display panel is being engaged to the fixture mount. In this case, the track does not need to be pivoted downwardly from an upright orientation prior to connecting the display panel to the fixture mount. Rather, once the display panel has been connected to the fixture mount, the track is pivoted upwardly to the generally upright orientation.

Although in some embodiments described above, the base mounts are described as being fastened a wall surface WS or upright, if desired, in these embodiments, the base mounts may alternatively be fastened to both the wall surface WS and the floor surface or only to the floor surface. Still alternatively, the base mounts may be designed such that their weights are sufficient to maintain the rails in position obviating the need for fasteners to secure the base mounts to the wall surface, uprights and/or floor surface.

Although the display panel is described as being connected to the fixture mount while it is still in its packaging, those of skill in the art will appreciate that the display panel may be removed from its packaging prior to installation. Also if desired, the position of the fixture mount on the rails can be adjusted before the display panel is connected to the fixture mount obviating the need to adjust the fixture mount and connected display panel after the rails have been pivoted to their generally upright orientation.

Although the fixture mounting assemblies are described as having a display panel connected thereto, those of skill in the art will appreciate that other types of fixtures can be connected to the fixture mounting assemblies. For example, rather than connecting a display panel to the fixture mount, an interactive board (IWB) or other fixture may be connected to the fixture mount.

Although particular retainer configurations have been described, those of skill in the art will appreciate that many alternative configurations are possible. For example, the retainers may be formed as locks, clamps or other fastening mechanisms that allow the rails to be retained in their upright orientations.

Although embodiments have been described above with reference to the figures, those of skill in the art will appreciate that variations and modifications may be made without departing from the scope thereof as defined by the appended claims.

What is claimed is:

1. A fixture mounting assembly comprising:
    a generally upright track; and
    a fixture mount supported on the track and configured to engage a fixture, said fixture mount being moveable along said track to different elevations, said track being pivotable between its generally upright orientation and a generally horizontal orientation to facilitate engagement of said fixture to said fixture mount, and after engagement of the fixture to the fixture mount, the track being pivotable back to its generally upright orientation thereby to permit the fixture mount and engaged fixture to be moved along the track to a desired elevation.

2. The fixture mounting assembly of claim 1, wherein the track comprises at least one rail.

3. The fixture mounting assembly of claim 2, wherein said track further comprises at least one retainer configured to retain said track in said upright orientation.

4. The fixture mounting assembly of claim 3, wherein said retainer is configured to act between said track and an upright support surface.

5. The fixture mounting assembly of claim 4 wherein said retainer comprises a component carried by said at least one rail and a component mounted on said support surface, said components being engageable to retain said track in said upright condition orientation and disengageable to permit pivoting of said track to said generally horizontal orientation.

6. The fixture mounting assembly of claim 2, wherein said track further comprises a base mount pivotally coupled to said at least one rail adjacent a bottom end thereof.

7. The fixture mounting assembly of claim 5, wherein the base mount is configured for connection to at least one of the upright support surface and a floor surface.

8. The fixture mounting assembly of claim 6, wherein the height of the base mount is adjustable.

9. The fixture mounting assembly of claim 6, wherein the height of the base mount is generally equal to the depth of packaging of the fixture.

10. The fixture mounting assembly of claim 2, wherein the fixture mount comprises a locking mechanism to fix the position of the fixture mount on the rail.

11. The fixture mounting assembly of claim 10 wherein said fixture mount is pivotably mounted on said track.

12. The fixture mounting assembly of claim 1, wherein the track comprises a plurality of laterally spaced rails.

13. The fixture mounting assembly of claim 12, wherein said track further comprises at least one retainer configured to retain said track in said upright orientation.

14. The fixture mounting assembly of claim 12, wherein said track further comprises a base mount pivotally coupled to each rail adjacent a bottom end thereof.

15. A fixture installation method comprising:
    connecting a fixture to a fixture mount that is moveably supported on a track, while the track is in a generally horizontal orientation;
    pivoting the track and connected fixture to a generally upright orientation; and
    after pivoting the track back to the generally upright orientation, moving the fixture mount and connected fixture along the track to a desired elevation.

16. The method of claim 15, further comprising, prior to said connecting, pivoting the track from the generally upright orientation to the generally horizontal orientation.

17. The method of claim 15, further comprising, after pivoting the track back to the generally upright orientation, retaining the track to an upright mounting surface.

18. The method of claim 15, further comprising after moving the fixture mount and connected fixture to the desired elevation, pivoting the fixture mount relative to said track.

19. The method of claim 16, further comprising after moving the fixture mount and connected fixture to the desired elevation, pivoting the fixture mount relative to said track.

20. The method of claim 17, further comprising after moving the fixture mount and connected fixture to the desired elevation, pivoting the fixture mount relative to said track.

\* \* \* \* \*